(12) United States Patent
Nakamura et al.

(10) Patent No.: US 7,350,050 B2
(45) Date of Patent: Mar. 25, 2008

(54) DISK CONTROLLER WITH LOGICALLY PARTITIONING FUNCTION

(75) Inventors: Shuji Nakamura, Yokohama (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 361 days.

(21) Appl. No.: 10/986,895

(22) Filed: Nov. 15, 2004

(65) Prior Publication Data

US 2006/0069943 A1    Mar. 30, 2006

(30) Foreign Application Priority Data

Sep. 13, 2004   (JP)   ............................. 2004-265031

(51) Int. Cl.
*G06F 12/00* (2006.01)

(52) U.S. Cl. ...................... 711/173; 711/114; 711/129; 714/5

(58) Field of Classification Search ................ 711/129, 711/114, 173; 714/5
See application file for complete search history.

(56) References Cited

U.S. PATENT DOCUMENTS

| | | | | |
|---|---|---|---|---|
| 5,414,697 A | * | 5/1995 | Osaki | 370/236 |
| 5,910,953 A | * | 6/1999 | Inata | 370/395.51 |
| 6,282,197 B1 | * | 8/2001 | Takahashi et al. | 370/395.1 |
| 6,636,481 B1 | * | 10/2003 | Yamaguchi et al. | 370/230 |
| 7,062,605 B2 | * | 6/2006 | Chatterjee et al. | 711/114 |
| 2002/0095551 A1 | * | 7/2002 | Fujimoto et al. | 711/114 |
| 2002/0103969 A1 | | 8/2002 | Koizumi et al. | |

FOREIGN PATENT DOCUMENTS

JP       2002-182859       6/2002

* cited by examiner

*Primary Examiner*—Gary Portka
*Assistant Examiner*—Yong J. Choe
(74) *Attorney, Agent, or Firm*—Antonelli, Terry, Stout & Kraus, LLP.

(57) ABSTRACT

To provide a storage system partitioned into logical partitions. A storage system includes: a plurality of disk drives; and a disk controller that is connected to the disk drives and reads/writes data from/into the disk drives, wherein the disk controller includes: a disk control unit that exchanges data with the disk drives; a channel control unit that exchanges data with another computer; a switch unit that is connected to the disk control unit and the channel control unit and exchanges data therewith; and a control unit that controls the disk control unit, the channel control unit, and the switch unit, and wherein the disk controller is partitioned into a plurality of logical partitions, the control unit controls the partitioning into the logical partitions, and the switch unit controls a data transmission band width of each logical partition by obtaining, for each piece of data to be exchanged, information indicating a logical partition to which the data belongs, and arbitrating data transmission for the logical partition.

18 Claims, 15 Drawing Sheets

LPAR0

| NUMBER OF IOs/SEC | ① | CACHE HIT RATIO | ⑤ | % |
| BLOCK SIZE | ② | CACHE CAPACITY | ⑥ | GB |
| CAPACITY | ③ | | | |
| THROUGHPUT | ④ MB/S | | | |

*FIG. 2*

| LPAR | 0 | 1 | 2 | ... | n |
|---|---|---|---|---|---|
| RATIO | 30% | 20% | 40% | ... | 10% |

INTERNAL SWITCH UNIT LPAR INFORMATION 331

| INDEX NUMBER | 0 | 1 | 2 | 3 | 4 | 5 | 6 | 7 | 8 | 9 |
|---|---|---|---|---|---|---|---|---|---|---|
| LPAR NUMBER | 0 | 1 | 2 | 2 | 0 | 1 | 2 | 2 | 0 | 2 |

ARBITRATION WINNER TABLE

ARBITRATION WINNER POINTER

LPAR TABLE 844

| PORT ID | HOST GROUP | LU | LPAR |
|---|---|---|---|
| ww.xx.yy.01 | 0 | 0 | 0 |
| ww.xx.yy.01 | 0 | 1 | 1 |
| ww.xx.yy.01 | 0 | 2 | 2 |
| ... | ... | ... | ... |
| ww.xx.yy.zz | j-1 | m-1 | n |
| ww.xx.yy.zz | j | m | n |

| HOST ID | HOST GROUP |
|---|---|
| kk.ll.mm.nn | 0 |
| | ... |
| oo.pp.qq.rr | j |
| ss.tt.uu.vv | j |

FIG. 15

DISK CONTROLLER WITH LOGICALLY PARTITIONING FUNCTION

CLAIM OF PRIORITY

The present application claims priority from Japanese application P2004-265031 filed on Sep. 13, 2004, the content of which is hereby incorporated by reference into this application.

BACKGROUND

This invention relates to a storage system, in particular, a logically partitioned storage system.

In order to reduce the cost of storage system management, there exists a storage consolidation technique with which plural storage systems are consolidated into a single large-scale storage system.

This storage consolidation has the following problem that concerns the running of a business.

Even after storage consolidation is performed, it is required to run a business as smoothly as before the consolidation, although a storage system is accessed by host computers in various forms and the processing capability required of the storage system varies depending on which access form is used. For instance, when the storage system is used as a database, a capability is required with which it is possible to process a large number of requests. Also, when the storage system is used to back up data that is accumulated from day to day, a capability of processing a large size of data is required.

As described above, the processing capability required of a storage system varies depending on which access form is used by host computers, so at the time of consolidation, a system administrator who is familiar with the configurations of old and new storage systems has to make the settings of the system. For instance, a storage system is proposed in which a certain service level selected by each customer is guaranteed to the customer through a service level guarantee contract and, when its storage performance is likely to drop, access is distributed by, for instance, migrating data stored in a storage volume, on which access is concentrated (see JP 2002-182859 A, for instance).

According to the invention described in JP 2002-182859 A, in a data center business undertaking out-sourcing of data management, it becomes possible to guarantee a certain service level based on a service level agreement(SLA) selected by each customer.

SUMMARY

This invention provides a storage system where it is possible to perform storage consolidation without exerting any influences on storage system configuration information, thereby making it possible to continue a business.

With the invention described in JP 2002-182859A, however, a certain service level is guaranteed to each customer based on the average usage ratio, capacity concerning disk drives, and the like but no consideration is given to service level guaranteeing that supports various access forms.

It is therefore an object of this invention to provide a storage system where resources have been logically partitioned, thereby achieving SLA guaranteeing that supports various access forms.

A storage system according to the present invention includes: a plurality of disk drives; and a disk controller that is connected to the disk drives and reads/writes data from/into the disk drives, wherein the disk controller includes: a disk control unit that exchanges data with the disk drives; a channel control unit that exchanges data with another computer; a switch unit that is connected to the disk control unit and the channel control unit and exchanges data therewith; and a control unit that controls the disk control unit, the channel control unit, and the switch unit, wherein the disk controller is partitioned into a plurality of logical partitions, the control unit controls the partitioning into the logical partitions, and the switch unit controls a data transmission band width of each logical partition by obtaining, for each piece of data to be exchanged, information indicating a logical partition to which the data belongs, and arbitrating transmission of the data to be exchanged for the logical partition.

According to this invention, band width is allocated to each LPAR (logical partition) in an internal switch unit 330 of a disk controller 300, thereby guaranteeing the band width of an internal network to the LPAR. With this configuration, arbitration between usage ratios of the band width of the internal network in a post-consolidation system, in which plural systems have been consolidated, becomes easy. As a result, it becomes possible that processes using various access forms are consolidated.

BRIEF DESCRIPTION OF THE DRAWINGS

FIG. 2 is an explanatory diagram of LPAR information inputted from an SVP (Service Processor) according to the first embodiment of this invention.

FIG. 15 is an explanatory diagram showing an example of an LPAR table according to the fourth embodiment of this invention.

DETAILED DESCRIPTION OF THE PREFERRED EMBODIMENTS

Hereinafter, a first embodiment of this invention will be described with reference to the drawings.

Figure 1:
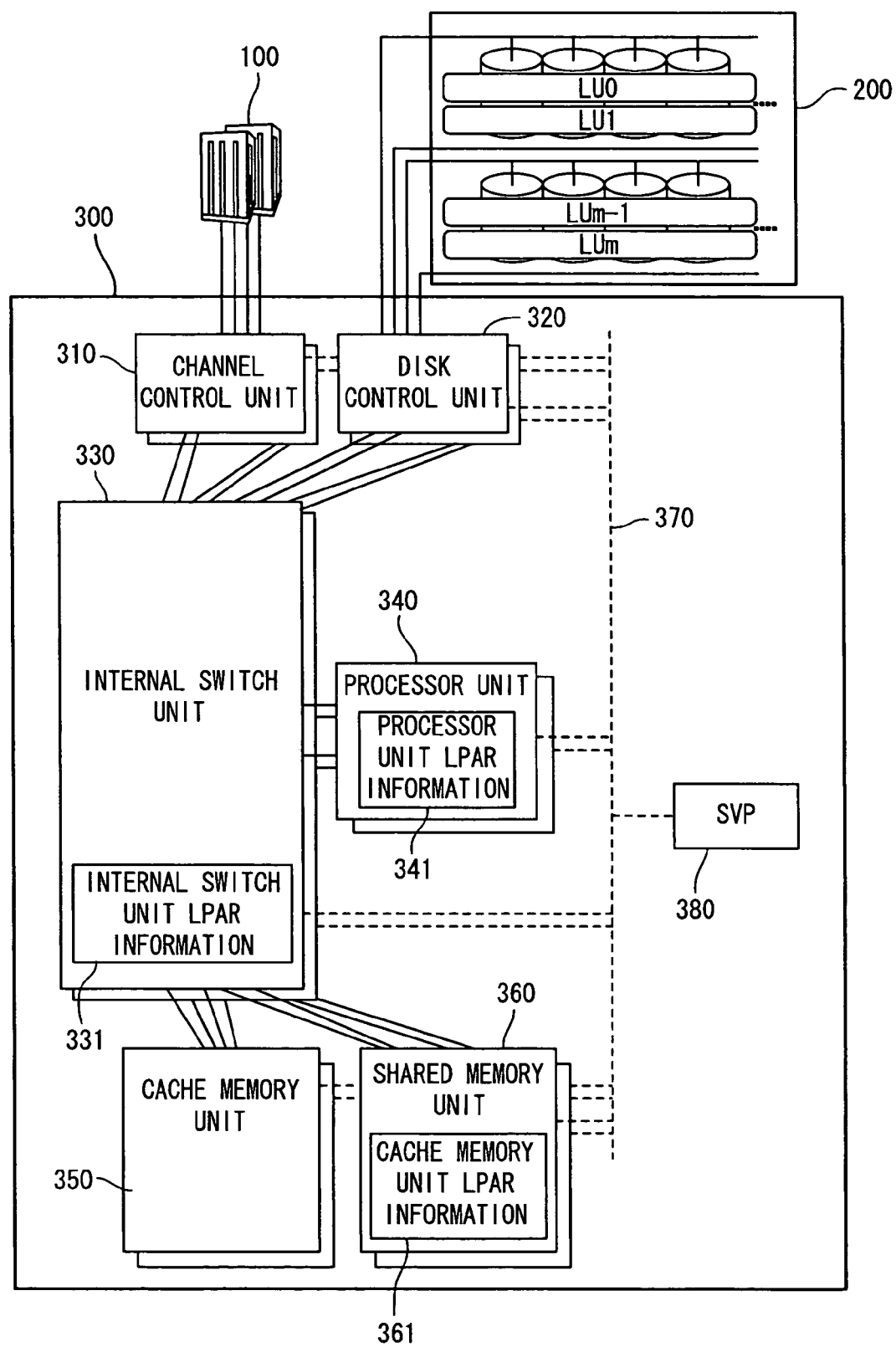
FIG. 1 is a block diagram showing a configuration of a storage system according to a first embodiment of this invention.

FIG. 1 is a block diagram showing a configuration example of a system including a storage system according to the first embodiment of this invention. The system shown in FIG. 1 includes plural host computers 100 and a storage system. The storage system includes a disk controller 300 and plural disk drives 200.

The plural host computers 100 and the plural disk drives 200 are connected to the disk controller 300.

The disk controller 300 includes plural channel control units 310, plural disk control units 320, plural internal switch units 330, plural processor units 340, plural cache memory units 350, and plural shared memory units 360. Each of those units is connected to a service processor (SVP) 380 through a management network 370.

The channel control units 310 are interfaces that establish connection with the host computers 100.

The disk control units 320 are interfaces that establish connection with the disk drives 200.

The internal switch units 330 connect the channel control units 310, the disk control units 320, the processor units 340, the cache memory units 350, and the shared memory units 360 to each other and transmits/receives data, such as packets, exchanged between these units. It should be noted that an internal network is formed by the internal switch units 330.

The processor units 340 control of each unit of the disk controller 300.

The cache memory units 350 temporarily hold data exchanged between the channel control units 310 and the disk control units 320.

The shared memory units 360 hold control information such as the configuration information of the host computers 100, the disk drives 200, and the disk controller 300 and the directory information of the caches.

The management network 370 is a network that connects the SVP 380 and each unit of the disk controller 300 to each other.

The SVP 380 is a terminal used to change the setting and configuration of each unit of the disk controller 300. In particular, as will be described later, the SVP 380 sets logical partitions (LPARs) of each unit. In this embodiment, the SVP 380 is connected to each unit through the management network 370, although this connection may be established through also a network outside the disk controller 300.

The internal switch units 330 include internal switch unit LPAR information 331, the processor units 340 include processor unit LPAR information 341, and the shared memory units 360 include cache memory LPAR information 361. It should be noted that the channel control units 310 may include channel control unit LPAR information.

According to those LPAR information, each of the channel control units 310, the disk control units 320, the internal switch units 330, the processor units 340, the cache memory units 350, and the shared memory units 360 is partitioned into logical units. As a result of the partitioning into the logical units (LPARs), the disk controller 300 performs as plural logical disk controllers.

The processor unit LPAR information 341 is information indicating a ratio of processing of the processor units 340 allocated to each LPAR obtained through the partitioning. The allocation of the processing is realized using a time sharing, for instance. It should be noted that the logical partitioning may be performed by executing firmware called the "hypervisor". In this case, guest OSs are executed on logical processors provided by the hypervisor and the plural logical processors are mapped to the physical processors by the hypervisor.

The internal switch unit LPAR information 331 is information indicating a ratio of a band width allocated to each partitioned LPAR. More specifically, for each LPAR number, the internal switch unit LPAR information 331 shows a ratio of the band width allocated to its corresponding LPAR.

The cache memory unit LPAR information 361 is information indicating a ratio of a cache memory capacity to be used by each partitioned LPAR. The processor units 340 know the cache memory capacity that each LPAR can use by referring to the cache memory unit LPAR information 361 and use an area of the cache memory.

The disk drives 200 are each composed of plural hard disks or the like. In those plural hard disks, plural logical units (LUs) that are logical areas are set.

The storage system according to this embodiment configured in the manner described above performs processing in a manner described below.

A host computer 100 sends an access request to the storage system.

The channel control unit 310 of the storage system receives this request. Then, the channel control unit 310 analyzes the request and determines an LPAR that should process the request. Then, the channel control unit 310 adds information indicating the determined LPAR to the received request and sends it to each processor unit 340. The processor unit 340 performs processing based on the received request. During this processing, the internal switch unit 330 controls a communication band width based on the information indicating the LPAR corresponding to the request.

Next, a setting of the LPARs of the disk controller 300 will be described.

In the disk controller 300 according to this embodiment, a setting as to how to perform the logical partitioning has been made by an administrator. Information indicating the setting is held in the processor unit LPAR information 341, the internal switch unit LPAR information 331, the cache memory unit LPAR information 361, or the like.

At the time of consolidation where plural systems are consolidated, the administrator sets pre-consolidation performance information of each system in the LPAR information 341 or the like of the disk controller 300. As a result, the disk controller 300 logically operates as the plural systems that operated before the consolidation.

FIG. 2 shows an example of LPAR information inputted through the SVP 380 at the time of the setting of the LPARs of the disk controller 300.

The administrator inputs performance information into the SVP 380. The inputted performance information contains the number of IOs per second (IOPS (processing capability)), a cache hit ratio [%], a block size, a cache capacity [GB], a disk drive capacity, a throughput [MB/s], and the like. It should be noted that the throughput is not necessarily required to be explicitly inputted and may be automatically computed by multiplying the IOPS by the block size. The administrator inputs this performance information for each set LPAR. It should be noted that it is also possible to create LPARs whose performance information is not inputted and whose performance is not designated. When performance is not designated for every LPAR, LPARs having the same performance are created based on a predetermined certain value, for instance. Also, when performance is not designated for some LPARs, after LPARs whose performance is designated are set, remaining LPARs are automatically created using resources which are not allocated, for instance.

Next, LPAR allocation information is calculated from the performance information inputted by the administrator.

Figure 3:
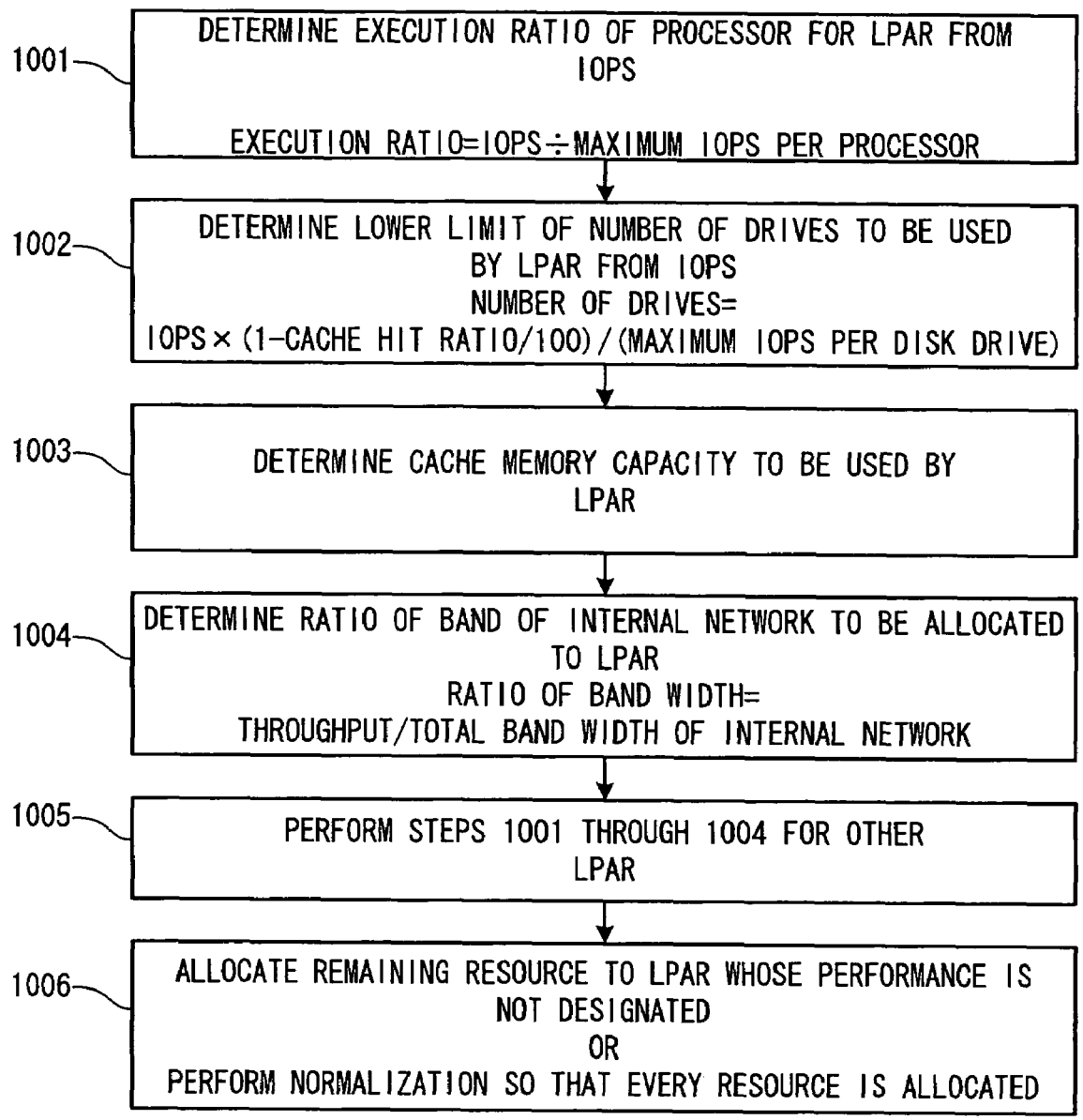
FIG. 3 is a flowchart of LPAR allocation information calculation processing according to the first embodiment of this invention.

FIG. 3 is a flowchart of LPAR allocation information calculation processing performed by the SVP 380.

First, from the IOPS of the inputted performance information, the SVP 380 calculates a processor execution ratio to be allocated to its corresponding LPAR. The processor execution ratio is calculated by dividing the IOPS by the maximum IOPS per processor. It should be noted that when the execution ratio exceeds 100%, a setting is made so that the processing of the LPAR is allocated to plural processors (1001).

Next, a lower limit is determined for the number of disk drives to be used by the LPAR(1002).

The number of disk drives determines the IOPS of a corresponding LU formed by the disk drives. In other words, when the LU is formed by plural disk drives, as the number of drives used is increased, the parallelism of disk drive access is enhanced and the IOPS of the LU that is a collection of disk drives is improved.

The lower limit of the number of disk drives is calculated by obtaining a cache miss ratio (%) through subtraction of a cache hit ratio (%) from a value "100", multiplying the IOPS by the cache miss ratio, and dividing a result of the multiplication by the maximum IOPS per disk drive. It should be noted that when the total capacity of the calculated number of disk drives is below the disk drive capacity shown in the performance information inputted by the administrator, the disk drive capacity set by the administrator is given a higher priority. Therefore, the number of drives satisfying the set disk drive capacity is re-computed.

Next, a cache capacity is set for the LPAR from the value of the cache capacity shown in the inputted performance information (1003).

Next, a ratio of a band width of the internal network to be allocated to the LPAR is set with reference to a throughput value obtained by multiplying the processor IOPS by the block size. More specifically, a calculation is made in which the throughput value is divided by the total band width of the internal network (1004).

Next, the operations in the steps 1001 through 1004 are executed for other LPARs (1005).

Next, after the setting of the allocation information for the LPARs whose performance information has been inputted, remaining resources are allocated to LPARs whose performance information is not inputted (1006). Alternatively, when the setting for every LPAR is finished, the allocation is normalized so that every resource of the disk controller 300 is used up by the LPAR. For instance, when the execution ratio of the processor units 340 does not reach 100% in total even after the setting for every LPAR, the execution ratio is re-computed for each LPAR so that the execution ratio becomes 100% in total.

Through the processing described above, the LPAR allocation information of the disk controller 300 is set.

It should be noted that the set information is sent from the SVP 380 to the channel control units 310, the disk control units 320, the internal switch units 330, the processor units 340, and the shared memory units 360 and is held therein. In the channel control units 310, correspondences between the LPARs and the LUs after the allocation are held. The processor units hold a ratio of the processor processing to be used by each LPAR. The internal switch units 330 hold a ratio of the band width to be used by each LPAR. The shared memory units 360 hold a capacity of the cache memories 350 to be used by each LPAR and the configuration information (disk drive capacity, number of drives, block size, and the like) of an LU of the disk drive 200 to be used by each LPAR.

Next, the configurations and operations of the processor units 340, the channel control units 310, and the internal switch units 330 of the disk controller 300 according to this embodiment will be described. It should be noted that in the following description, the LPARs are executed through time sharing.

A host computer 100 sends a read request or a write request to the disk controller 300. On receiving the request from the host computer, each channel control unit 310 finds a logical unit (LU) in the disk controller 300 with respect to which the request has been issued.

The channel control unit 310 refers to a table (LPAR table 312 shown in FIG. 5) showing correspondences between the LUs and the LPARs and finds an LPAR that is in charge of the LU with respect to which the request has been issued. Then, the channel control unit 310 sends the request to each processor unit 340 through each internal switch unit as processing of the LPAR. Following this, at a timing at which the LPAR processing should be performed, the processor unit 340 processes the request and performs access processing to the disk drives 200 by issuing an instruction to each cache memory unit 350 or each disk control unit 320 through the internal switch unit 330.

Figure 4:
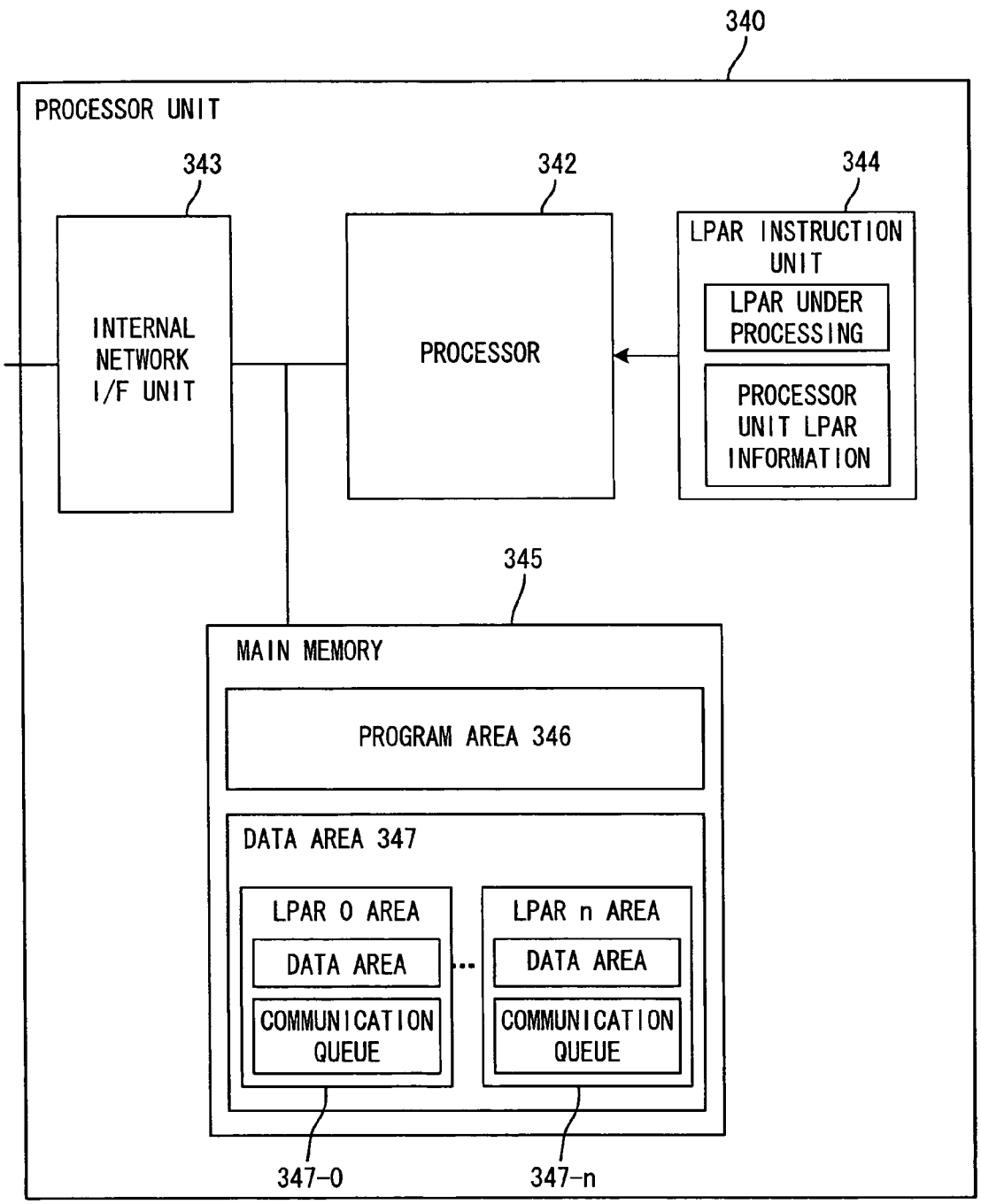
FIG. 4 is a block diagram showing a configuration of a processor unit according to the first embodiment of this invention.

FIG. 4 is a block diagram showing a configuration of the processor unit 340.

A processor 342 is composed of a CPU and the like. It should be noted that in FIG. 4, only one processor 342 is shown, although the processor unit 340 may be provided with plural processors.

An internal network interface (I/F) unit 343 is an interface that establishes connection between the processor unit 340 and the internal switch unit 330 and achieves data exchange therebetween.

An LPAR instruction unit 344 instructs the processor 342 to perform allocation processing for each LPAR. In the LPAR instruction unit 344, the LPAR number of an LPAR that is currently under processing is indicated. The processor unit LPAR information 341 stores information indicating a ratio of processing allocated to each LPAR as described above. The LPAR instruction unit 344 obtains the ratio of each LPAR from the processor unit LPAR information 341 and allocates an execution time to the LPAR.

As a concrete example, a case where two LPARs, an "LPAR 1" and an "LPAR 2", are set will be described.

First, the LPAR instruction unit 344 allocates an execution time (ratio of the LPAR 1) to the LPAR 1 and instructs the processor 342 to start the processing of the LPAR 1. Under this state, the LPAR under processing becomes the LPAR 1. The LPAR instruction unit 344 counts a timer from a point in time when the processing of the LPAR 1 is started and, when the allocated execution time has expired, instructs the processor 342 to end the processing by the LPAR 1 and saves the data and register used in the processing by the LPAR 1.

Next, the LPAR instruction unit 344 allocates an execution time (ratio of the LPAR 2) to the LPAR 2 and instructs the processor 342 to start the processing of the LPAR 2. Under this state, the LPAR under processing becomes the LPAR 2. The LPAR instruction unit 344 counts the timer from a point in time when the processing of the LPAR 2 is started and, when the allocated execution time has expired, instructs the processor 342 to end the processing by the LPAR 2 and saves the data and register used in the processing by the LPAR 2.

Next, the LPAR instruction unit 344 allocates an execution time to the LPAR 1. Hereafter, the processing of the LPAR 1 and the LPAR 2 is repeated.

A main memory 345 is a memory used by the processor unit 340. The main memory 345 is composed of a program area 346 storing programs and data area 347 storing data.

The data area 347 is divided into plural areas that are respectively used by the LPARs. In each area, data and a communication queue used by its corresponding LPAR are held.

Figure 5:
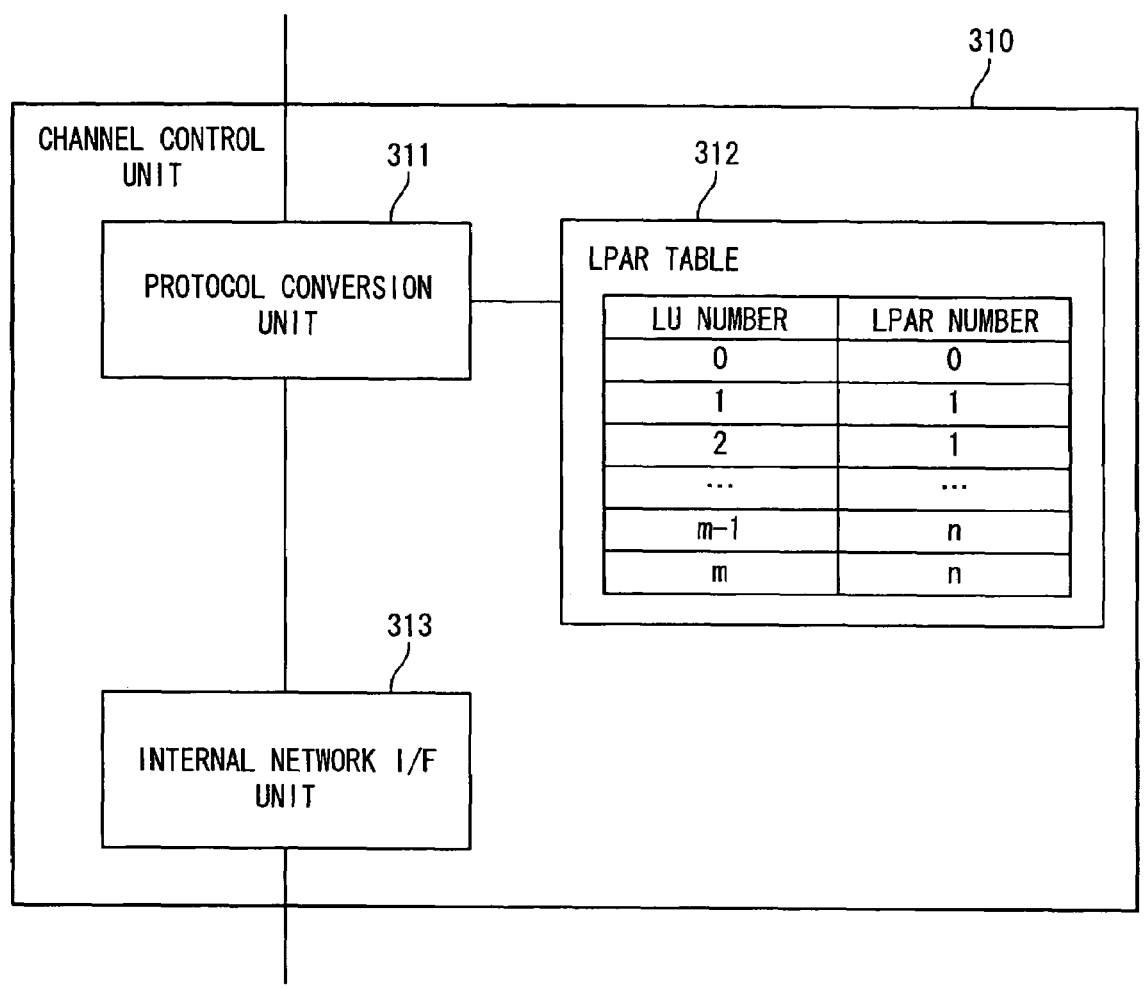
FIG. 5 is a block diagram showing a configuration of a channel control unit according to the first embodiment of this invention.

FIG. 5 is a block diagram showing a configuration of the channel control unit 310.

A protocol conversion unit 311 is connected to each host computer 100 through a network or the like. The protocol conversion unit 311 performs conversion of each protocol used inside or outside the disk controller 300 and transmits/receives data.

An internal network interface (I/F) 313 is an interface that is connected to each internal switch unit 330 and exchanges data with each unit of the disk controller 300.

An LPAR table 312 is a table showing the LPARs and the logical units (LUs) allocated to and used by the LPARs.

As to the LUs used by the respective LPARs, after a disk capacity to be allocated to each LPAR is determined through the processing described with reference to FIG. 3, the administrator allocates an LU corresponding to the disk capacity to the LPAR and sets it using the SVP 380. The protocol conversion unit 311 refers to this LPAR table 312 and knows an LPAR that is in charge of the LU with respect to which a request has been issued.

When a request to an LU numbered "2" is issued by a host computer 100, for instance, the protocol conversion unit 311 refers to the LPAR table 312 and knows that the LPAR corresponding to the LU numbered "2" is "1". Then, the protocol conversion unit 311 adds the obtained number of the LPAR to the request and sends the request to each internal switch unit 330 through the internal network I/F unit 313.

Figure 6:
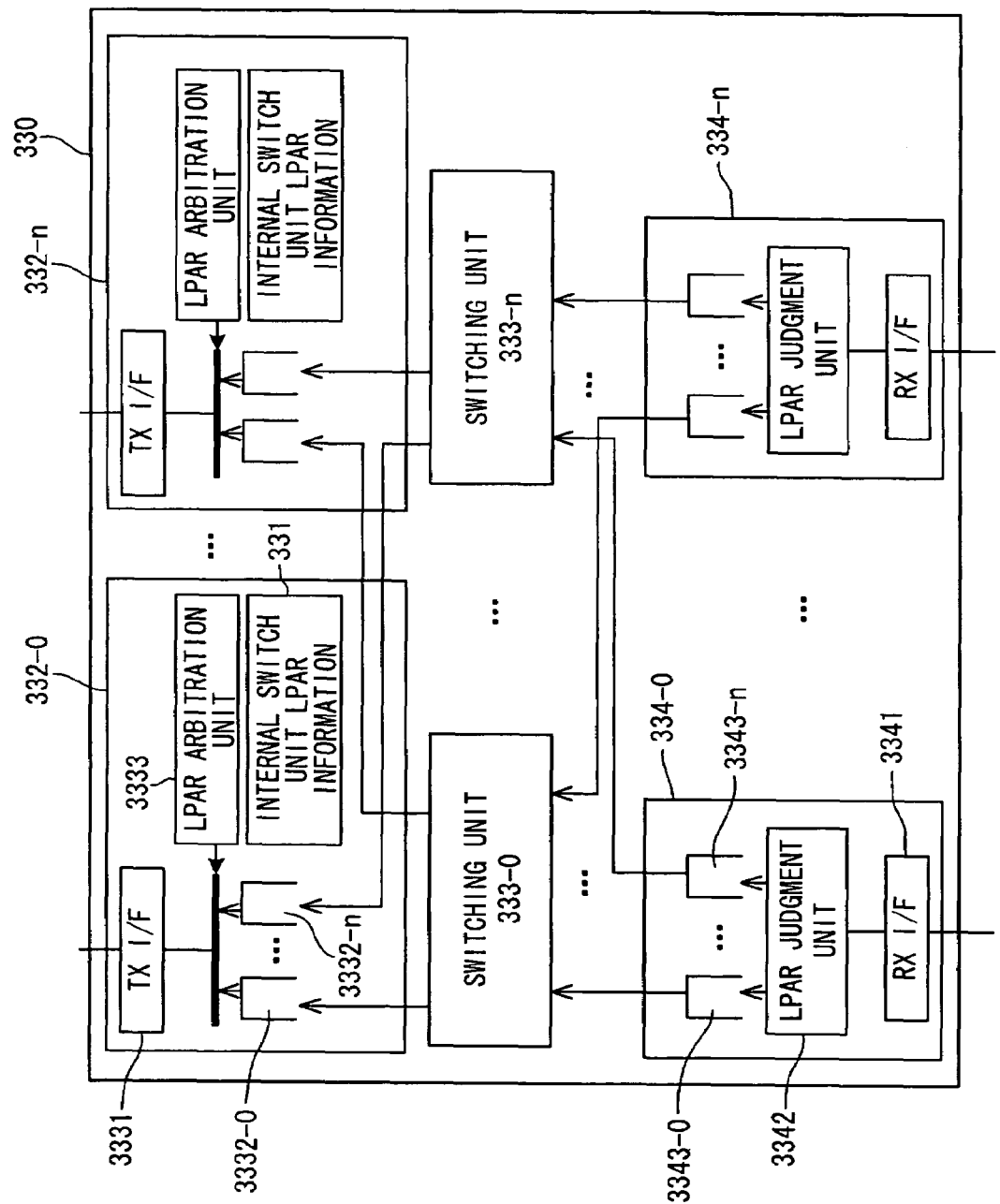
FIG. 6 is a block diagram showing a configuration of an internal switch unit according to the first embodiment of this invention.

FIG. 6 is a block diagram showing a configuration of the internal switch unit 330.

The internal switch unit 330 includes transmission units 332, switching units 333, and reception units 334. The number of the switching units 333 is set equal to the number of the set LPARs. The number of the transmission units 332 and the number of the reception units 334 are each set equal to the number of the paths connected to the internal switch unit 330.

Each transmission unit 332 includes a TX interface (TX I/F) 3331, LPAR transmission buffers 3332 (3332-0 through 3332-n), an LPAR arbitration unit 3333, and internal switch unit LPAR information 331.

The TX I/F 3331 is an output-side interface of the internal switch.

The LPAR transmission buffers 3332-0 through 3332-n are transmission buffers provided for the respective LPARs and the number of those buffers is set equal to the number of the set LPARs (O through n (n+1 buffers are provided)).

The LPAR arbitration unit 3333 arbitrates the transmission of packets by the TX I/F 3331 for each LPAR. The internal switch unit LPAR information 331 stores information about a ratio of the band width of the internal switch unit 330 allocated to each LPAR.

The number of the switching units 333-0 through 333-n is set equal to the number of the set LPARs and each switching unit sends packets passed from the reception units 334 to intended transmission units 332 based on transmission destination addresses.

Each reception unit 334 includes an RX interface (RX I/F) 3341, an LPAR judgment unit 3342, and LPAR reception buffers 3343-0 through 3343-n.

The RX I/F 3341 is an input-side interface of the internal switch.

The LPAR judgment unit 3342 finds, for each packet received by the RX I/F 3341, an LPAR, to which the packet belongs, and sends the received packet to a reception buffer (LPAR reception buffer 3343) corresponding to the LPAR.

The LPAR reception buffers 3343-0 through 3343-n are reception buffers provided for the respective LPARs and the number of these buffers is set equal to the number of the set LPARs (0 through n i.e. n+1 buffers are provided).

Next, an operation of the internal switch unit 330 will be described.

First, the RX I/F 3341 of the reception unit 334 sends each received packet to the LPAR judgment unit 3342. The LPAR judgment unit 3342 refers to the header portion of the packet which has been sent and obtains the LPAR number of an LPAR to which the packet belongs. Then, the LPAR judgment unit 3342 sends the packet to an LPAR reception buffer 3343 corresponding to the obtained LPAR number. After receiving the packet, the LPAR reception buffer 3343 sends the packet to the switching unit 333 at a predetermined timing.

The switching unit 333 refers to the header of the received packet, obtains the transmission destination address of the packet, and sends the packet to an LPAR transmission unit 332 corresponding to the address. In the transmission unit 332, the packet is received by the LPAR transmission buffer 3332 corresponding to the LPAR number.

The packet received by the LPAR transmission buffer 3332 is sent to the TX I/F 3331 and is transmitted therefrom according to an instruction from the LPAR arbitration unit 3333.

The LPAR arbitration unit 3333 refers to the internal switch unit LPAR information 331 and determines how to transmit the packet. As described above, the internal switch unit LPAR information 331 stores information indicating a ratio of the band width allocated to each LPAR.

Figures 7A, 7B:
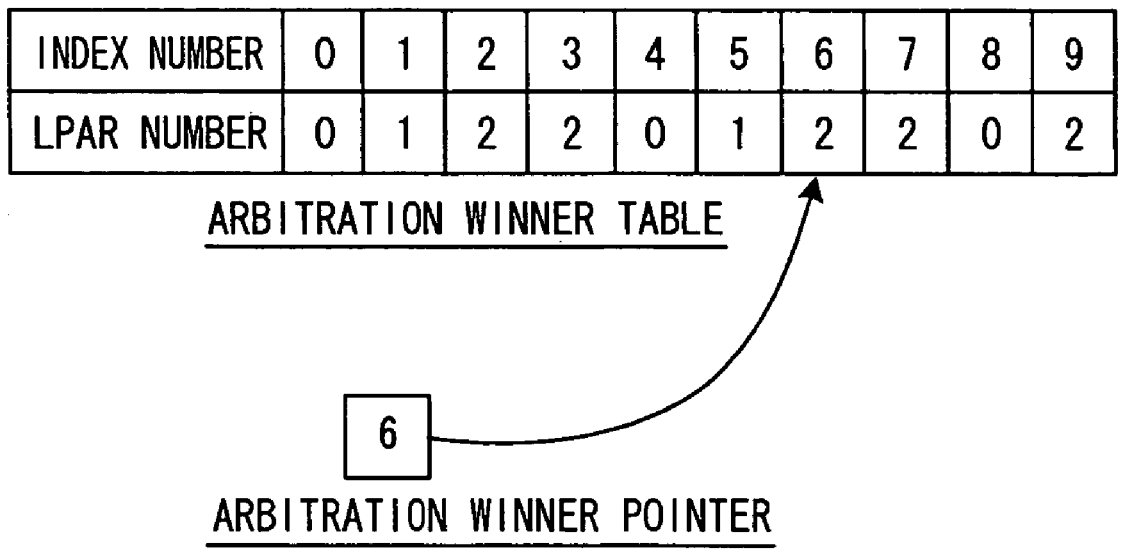
FIG. 7A is an explanatory diagram of internal switch unit LPAR information according to the first embodiment of this invention.
FIG. 7B is an explanatory diagram of the internal switch unit LPAR information according to the first embodiment of this invention.

FIG. 7A shows an example of the internal switch unit LPAR information 331. In the example shown in FIG. 7A, a ratio of the band width allocated to the LPAR numbered "0" is set at 30%, a ratio of the band width allocated to the LPAR numbered "1" is set at 20%, a ratio of the band width allocated to the LPAR numbered "2" is set at 40%, . . . , and a ratio of the band width allocated to the LPAR numbered "n" is set at 10%.

The LPAR arbitration unit 3333 refers to the internal switch unit LPAR information 331 and determines a ratio of the band width to be used to send the packet to its corresponding LPAR.

In actuality, as shown in FIG. 7B, an "arbitration winner table" and an "arbitration winner pointer" stored in the internal switch unit LPAR information 331 are used, for instance. In the arbitration winner table, information instructing how to select the LPARs for packet transmission is stored in advance based on the band width allocation to the LPARs. More specifically, the arbitration winner table is composed of index numbers and LPAR numbers corresponding to the index numbers. The arbitration winner pointer is information that determines which LPAR is to be selected from the arbitration winner table. With the arbitration winner table in the example shown in FIG. 7B, the LPARS numbered "0", "1", and "2" are respectively selected at ratios of 3/10, 2/10, and 5/10.

The LPAR arbitration unit 3333 increments the arbitration winner pointer (adds "1" to the pointer at a time) at the time of start of arbitration. Then, the LPAR arbitration unit 3333 obtains an LPAR number corresponding to an index number in the arbitration winner table that has the same value as the pointer. Following this, a packet corresponding to the LPAR number obtained in this manner is transmitted.

Figure 8:
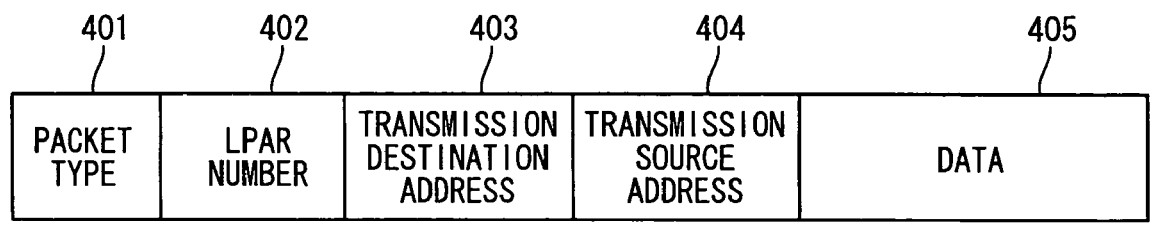
FIG. 8 shows an example of a packet according to the first embodiment of this invention.

FIG. 8 shows an example of a packet 400 used by the disk controller 300 according to this embodiment.

The packet 400 includes a packet type 401, an LPAR number 402, a transmission destination address 403, a transmission source address 404, and data 405.

The packet type 401 shows the type of the packet (whether the packet is a command or a response, for instance). The LPAR number 402 shows the number of an LPAR that is to deal with the packet. The transmission destination address 403 and the transmission source address 404 respectively show the transmission destination address and the transmission source address of the packet. The data 405 is the contents of data that the packet transmits.

In the storage system according to the first embodiment configured in the manner described above, in the internal switch unit 330 of the disk controller 300, a band width is allocated to each LPAR. As a result, arbitration between usage ratios of the band width of an internal network in a post-consolidation system, in which plural systems have been consolidated, becomes easy.

Next, a second embodiment will be described.

The second embodiment differs from the first embodiment in the configuration and processing of the internal switch unit. It should be noted that each component that is the same as that in the first embodiment is given the same reference numeral and the description thereof will be omitted.

Figure 9:
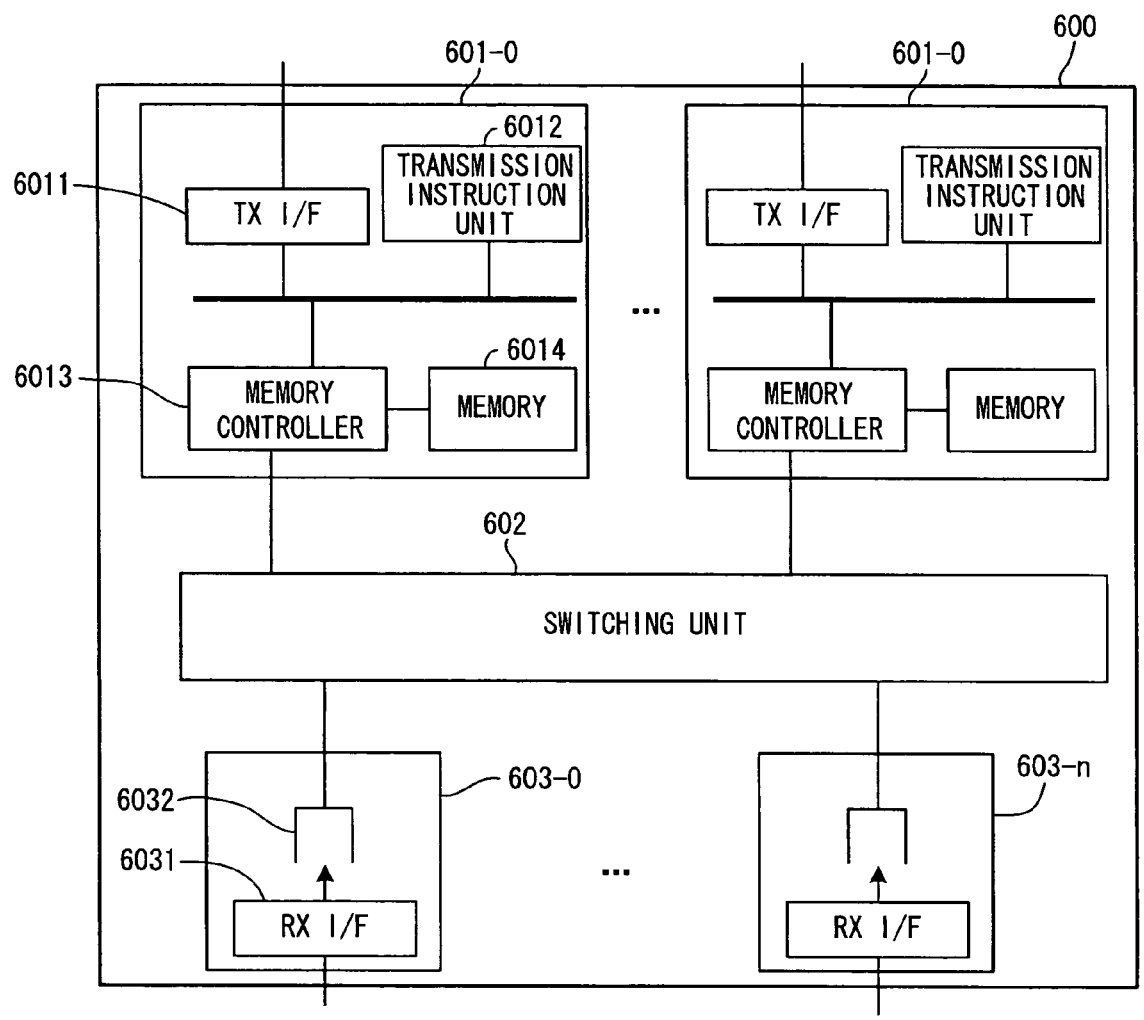
FIG. 9 is a block diagram showing a configuration of an internal switch unit according to a second embodiment of this invention.

FIG. 9 is a block diagram showing a configuration of an internal switch unit 600 according to the second embodiment.

The internal switch unit 600 includes transmission units 601, a switching unit 602, and reception units 603. The number of the transmission units 601 and the number of the reception units 603 are each set equal to the number of paths connected to the internal switch unit 600. Also, at least one switching unit 602 is provided in the internal switch unit 600.

Each transmission unit 601 includes a TX interface (TX I/F) 6011, a transmission instruction unit 6012, a memory controller 6013, and a memory 6014.

The TX I/F 6011 is an output-side interface of the internal switch.

The transmission instruction unit 6012 instructs the transmission of each packet held in the memory 6014 based on a ratio of a band width set for each LPAR.

The memory controller 6013 controls the writing/reading of each packet into/from the memory 6014.

The memory 6014 temporarily holds each packet. Also, the memory 6014 stores information indicating a ratio of the band width allocated to each LPAR obtained through logical partitioning.

The switching unit 602 sends packets passed from the reception units 603 to intended transmission units 601 based on transmission destination addresses.

Each reception unit 603 includes an RX interface (RX I/F) 6031 and a reception buffer 6032.

The RX I/F 6031 is an input-side interface of the internal switch.

The reception buffer 6032 temporarily holds each packet received by the RX I/F 6031.

Next, an operation of the internal switch unit 600 according to the second embodiment will be described.

The RX I/F 6031 of the reception unit 603 sends each received packet to the reception buffer 6032. After receiving the packet, the reception buffer 6032 sends the packet to the switching unit 602 at a predetermined timing.

The switching unit 602 refers to the header of the received packet and sends the packet to an intended transmission unit 601. This packet is held in the memory 6014 through the memory controller 6013 of the transmission unit 601.

The packet held in the memory 6014 is sent to the TX I/F 6011 and is transmitted therefrom according to an instruction from the transmission instruction unit 6012.

Figure 10:
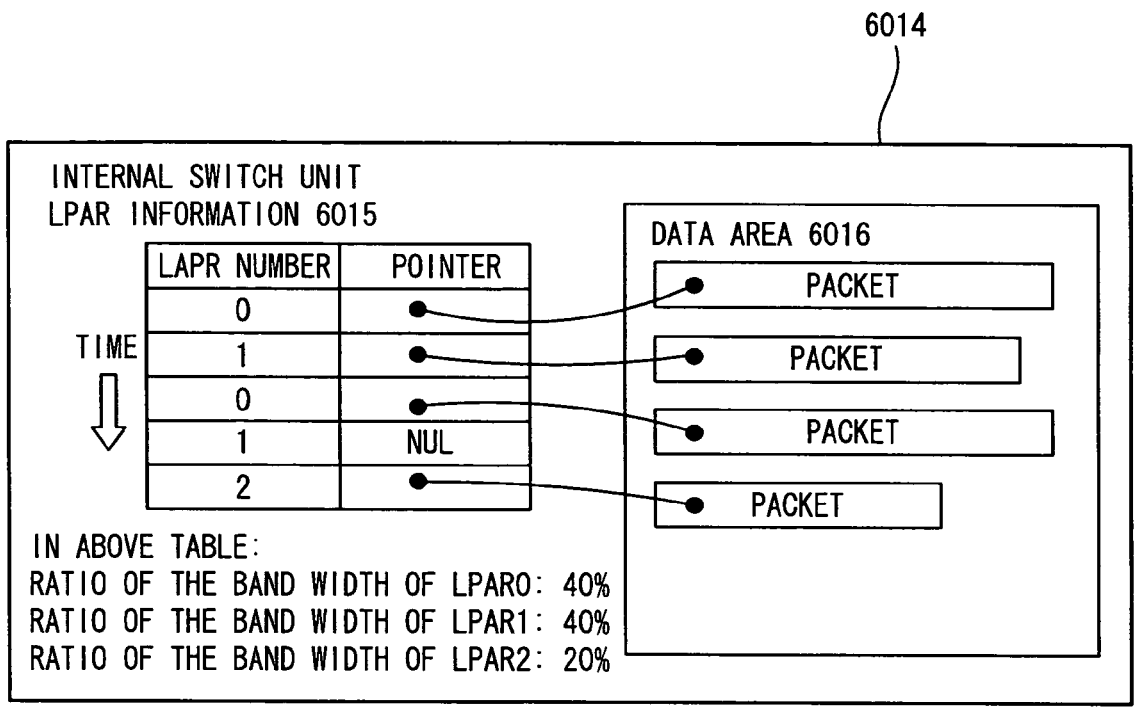
FIG. 10 shows an example of the contents of a memory according to the second embodiment of this invention.

FIG. 10 shows an example of the contents of the memory 6014.

The memory 6014 is divided into internal switch unit LPAR information 6015 and a data area 6016.

As described above, the internal switch unit LPAR information 6015 is information indicating a ratio of the band width allocated to each LPAR obtained through the logical partitioning. In this example, the internal switch unit LPAR information 6015 is composed of pairs of LPAR numbers and pointers indicating addresses in the data area.

Each packet sent from the switching unit 602 is stored in the data area 6016 under control by the memory controller 6013. When doing so, the memory controller 6013 stores an address, at which the packet is stored, in a pointer of the internal switch unit LPAR information 6015 corresponding to an LPAR number obtained from the header information of the packet.

Next, the transmission instruction unit 6012 sequentially refers to the internal switch unit LPAR information 6015 at predetermined time intervals, obtains packets held at addresses indicated by the pointers, sends the packets to the TX I/F 6011, and instructs transmission of the packets.

As a result, the packets are transmitted according to the ratios of the LPARs set in the internal switch unit LPAR information 6015.

In the storage system according to the second embodiment configured in the manner described above, like in the first embodiment, a ratio of a band width is allocated to each LPAR in the internal switch unit 330 of the disk controller 300. As a result, arbitration between usage ratios of a path band width in a post-consolidation system, in which plural systems have been consolidated, becomes easy. In addition, it becomes sufficient that reception buffers, whose number is equal to the number of the paths connected to the internal switch unit, are provided and a configuration having no transmission buffer is realized. As a result, a situation is prevented in which the number of buffers is limited by the number of LPARs, which makes it possible to perform system configuration with more flexibility.

Next, a third embodiment will be described.

The third embodiment differs from the first embodiment in the configuration and processing of the internal switch unit. It should be noted that each component that is the same as that in the first embodiment is given the same reference numeral and the description thereof will be omitted.

Figure 11:
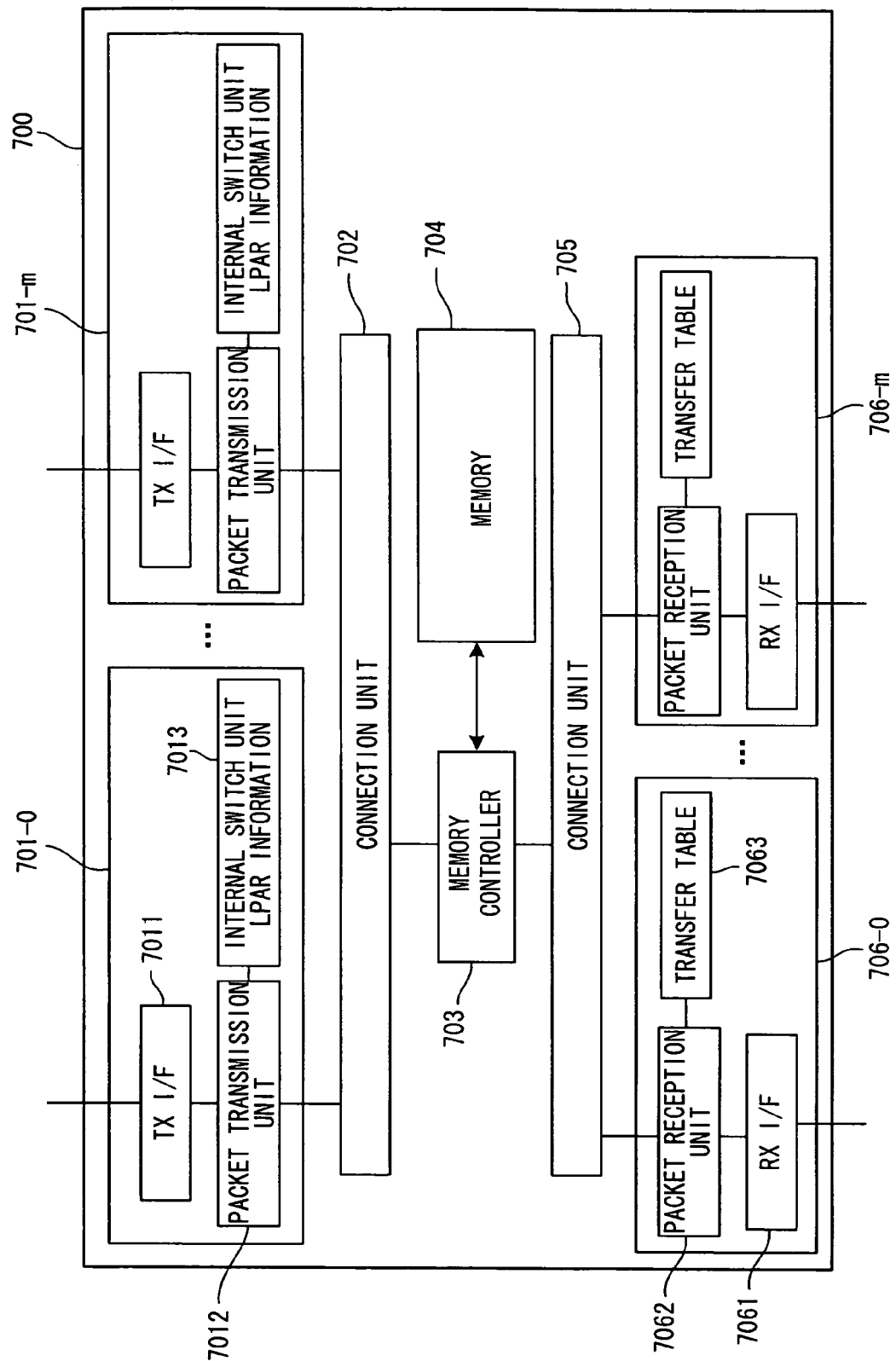
FIG. 11 is a block diagram showing a configuration of an internal switch unit according to a third embodiment of this invention.

FIG. 11 is a block diagram showing a configuration of an internal switch unit 700 according to the third embodiment.

The internal switch unit 700 includes transmission units 701, connection units 702 and 705, a memory controller 703, a memory 704, and reception units 706. The number of the transmission units 701 (701-0 through 701-m) and the number of the reception units 706 (706-0 through 706-m) are each set equal to the number of physically set ports (reception ports and transmission ports) (m+1 transmission units and m+1 reception units are provided).

Each transmission unit 701 includes a TX interface (TX I/F) 7011, a packet transmission unit 7012, and a memory controller 7013.

The TX I/F 7011 is an output-side interface of the internal switch.

The packet transmission unit 7012 transmits each packet held in the memory 704 based on information stored in the internal switch unit LPAR information 7013 and indicating a ratio of the band width of the internal switch unit 700 allocated to each LPAR.

The connection unit 702 connects the memory controller 703 and the respective transmission units 701-0 through 701-m to each other.

The memory controller 703 controls the writing/reading of each packet into/from the memory 704.

The memory 704 temporarily holds each packet.

The connection unit 705 connects the memory controller 703 and the respective reception units 706-0 through 706-m to each other.

Each reception unit 706 includes an RX interface (RX I/F) 7061, a packet reception unit 7062, and a transfer table 7063.

The RX I/F 7061 is an input-side interface of the internal switch. The packet reception unit 7062 holds each packet received by the RX I/F 7061 in the memory 704 through the memory controller 703. In the transfer table 7063, and the transmission destination address of the packet and the corresponding port number of a transmission unit 701 are stored in advance. The packet reception unit 7062 obtains an LPAR number and the transmission destination address from the header of the packet received by the RX I/F 7061 and stores the packet in a data area of the memory 704 corresponding to the port number.

Next, an operation of the internal switch unit 700 according to the third embodiment will be described.

Each packet received by the RX I/F 7061 of the reception unit 706 is passed to the memory controller 703 by the packet reception unit 7062. When doing so, the packet reception unit 7062 obtains a transmission destination address contained in the packet and obtains a port number corresponding to the obtained transmission destination address from the transfer table 7063. Then, the packet reception unit 7062 informs the memory controller 703 of the port number. Also, the packet reception unit 7062 determines an area of the memory 704 from the LPAR number of the received packet and the transmission destination port number of the packet.

The memory controller receives the packet from the packet reception unit 7062 and holds it in the area of the memory 704 determined by the packet reception unit.

Figure 12:
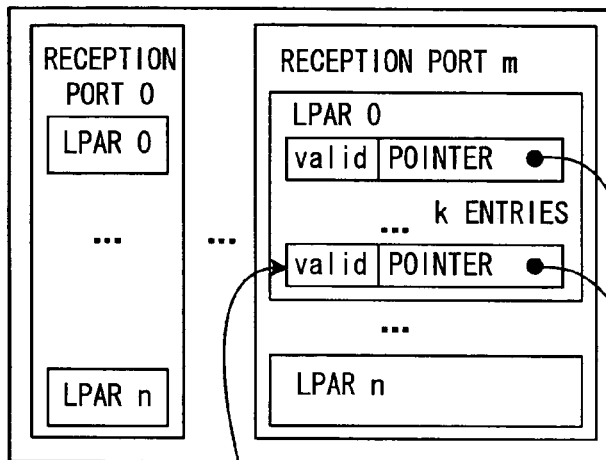
FIG. 12 shows an example of the contents of a memory according to the third embodiment of this invention.
Figure 12:
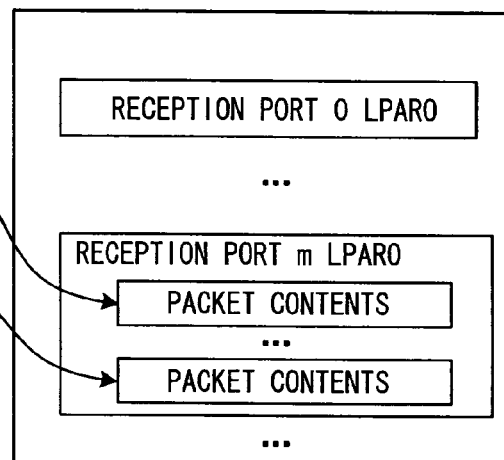
Figure 12:
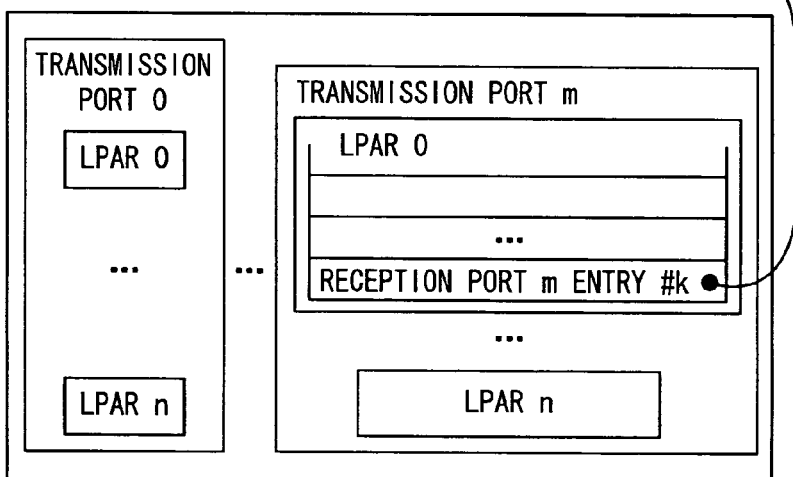

FIG. 12 shows an example of the contents of the memory 704.

The memory 704 is divided into a reception entry 7041, a reception data area 7042, and a transmission entry 7043.

The reception entry 7041 includes entries corresponding to respective reception port numbers and each reception port entry includes entries corresponding to the respective set LPARs.

The transmission entry 7043 includes entries corresponding to respective transmission port numbers and each transmission port entry includes entries corresponding to the respective set LPARs.

The memory controller 703 searches the reception entry 7041 for a free entry by referring to an LPAR area corresponding to a received packet in an entry corresponding to the port number of a reception unit 706 that received the packet. The memory controller 703 judges each entry, in whose "valid" field a pointer is written, as an entry that is already used and judges each entry, in whose "valid" field a value "false" is written, as a free entry.

Next, the received packet is held in the reception data area 7042. Then, an address, at which the packet is held, is written in the free entry found as a result of the search described above.

Next, the memory controller 703 obtains a transmission port number sent along with the packet from the reception unit 706 and stores a pointer to the entry, in which the address has been written, in an LPAR area corresponding to the packet in an entry corresponding to the transmission port number in the transmission entry 7043.

As described above, each packet received by the reception unit 706 is sequentially held in an entry of the reception entry 7041 corresponding to its reception port number and LPAR number and a pointer to the entry is sequentially written in the transmission entry 7043.

It should be noted that the transmission entry 7043 is held in a first-in first-out (FIFO) manner for each port number and each LPAR number.

Each packet held in this manner is transmitted by the transmission unit 701.

First, the packet transmission unit 7012 refers to the internal switch unit LPAR information 7013 and obtains band width allocation to each LPAR. Then, the packet transmission unit 7012 reads each packet and transmits it according to the obtained allocation.

In the packet reading, the transmission unit 701 refers to a transmission entry 7043 corresponding to the port number of itself and the LPAR number of an LPAR that should transmit the packet, obtains an entry in the reception entry 7041 by referring to a pointer held in the transmission entry 7043, and obtains a pointer in the entry in the reception entry 7041 that indicates an address in the reception data area 7042. Then, the transmission unit 701 reads the packet according to the obtained address.

As to the band width allocation, a configuration is conceivable in which like in the first embodiment described by referring to FIG. 7, a arbitration winner table and a arbitration winner pointer are stored in advance in the internal switch unit LPAR information 7013 and the packet transmission unit 7012 transmits a packet having an LPAR number corresponding to the arbitration winner pointer.

In the storage system according to the third embodiment configured in the manner described above, like in the first embodiment, a ratio of a band width is allocated to each LPAR in the internal switch unit 330 of the disk controller 300. As a result, arbitration between usage ratios of a path band width in a post-consolidation system, in which plural systems have been consolidated, becomes easy. In addition, reception buffers or transmission buffers are not provided for each LPAR thus set, which makes it possible to perform system configuration with more flexibility.

Next, a fourth embodiment will be described.

The fourth embodiment differs from the first embodiment in the configuration and processing of the disc control device 300. It should be noted that each component that is the same as that in the first embodiment is given the same reference numeral and the description thereof will be omitted.

Figure 13:
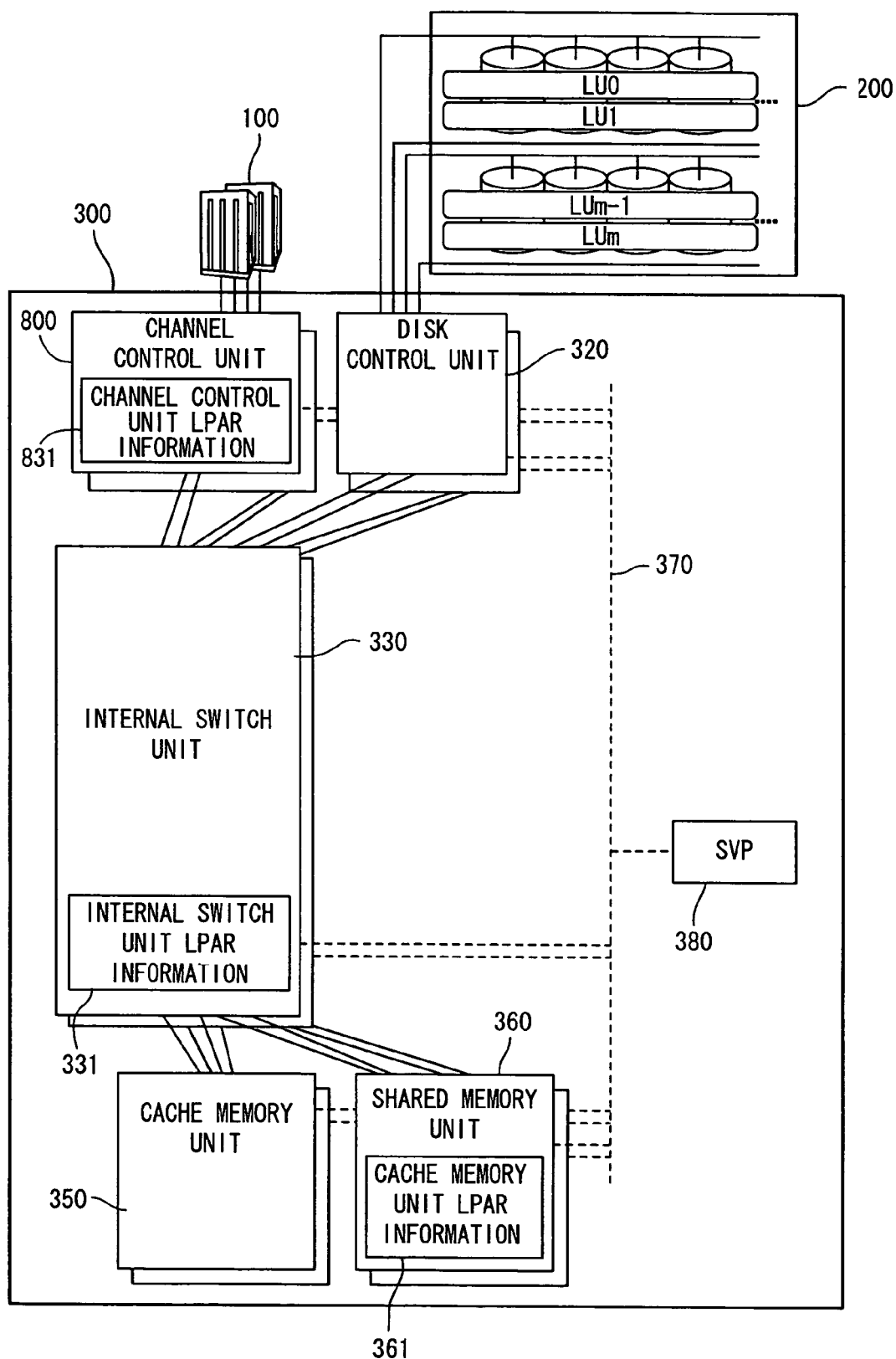
FIG. 13 is a block diagram showing a configuration of a storage system according to a fourth embodiment of this invention.

FIG. 13 is a block diagram showing a configuration of a storage system according to the fourth embodiment.

The fourth embodiment differs from the first embodiment shown in FIG. 1 in that the processor unit 340 does not exist and a channel control unit 800 is used in place of the channel control unit 310. Other components are the same as those in FIG. 1.

In the fourth embodiment, the channel control unit 800 achieves the function of the processor unit 340 in the first embodiment. It should be noted that a configuration may be used instead in which the disk control unit 320 achieves the function of the processor unit 340 instead of the channel control unit 800. Also, the processor unit may be contained in both of the channel control unit 800 and the disk control unit 320, thereby distributing the function of the processor.

Figure 14:
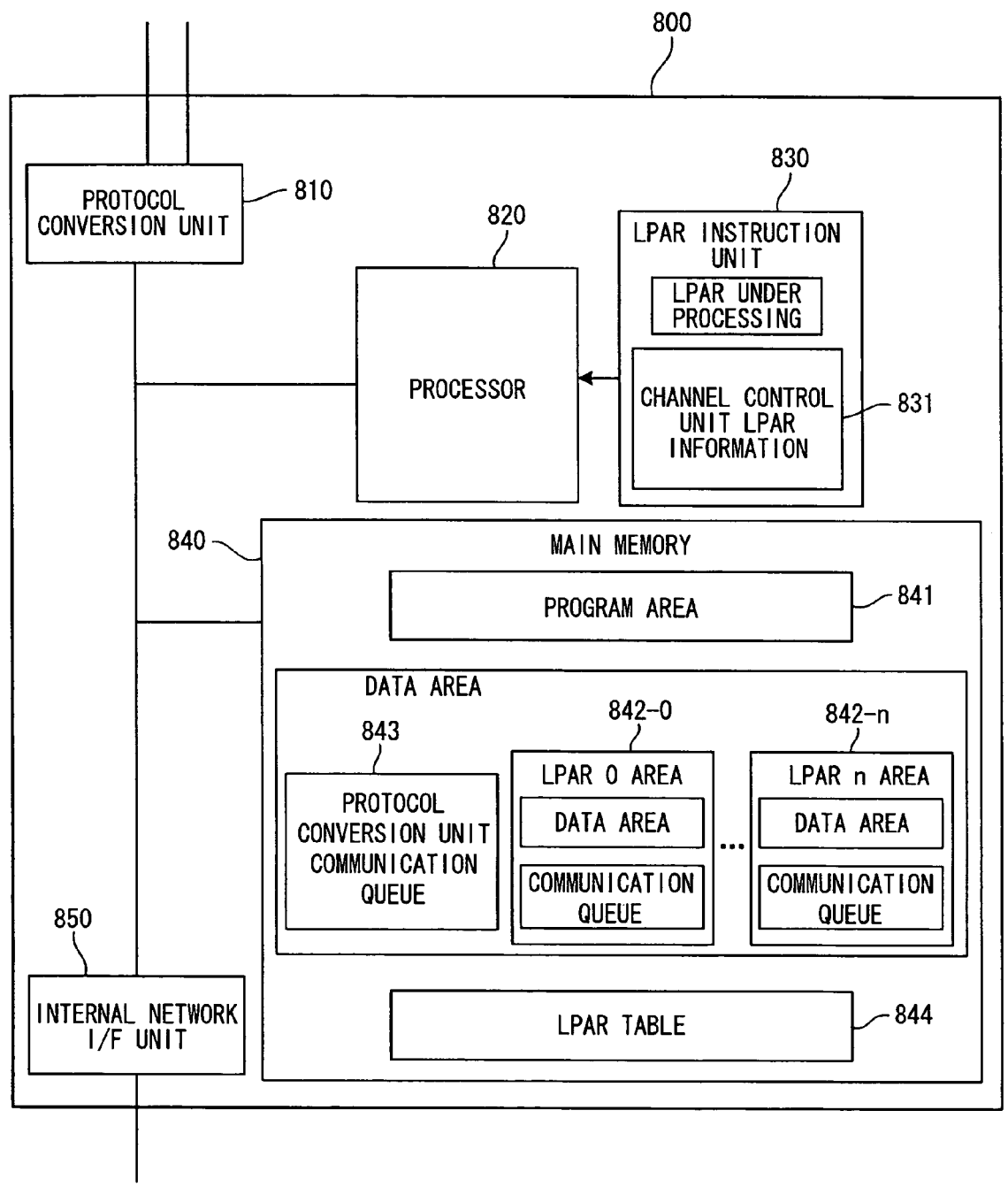
FIG. 14 is a block diagram showing a configuration of a channel control unit according to the fourth embodiment of this invention.

FIG. 14 is a block diagram showing a configuration of the channel control unit 800 according to the fourth embodiment.

In the channel control unit 800 according to the fourth embodiment, the function of the processor unit 340 shown in FIG. 4 is contained in the channel control unit 310 shown in FIG. 5 according to the first embodiment.

A protocol conversion unit 810 is connected to each host computer 100 through a network or the like. The protocol conversion unit 810 performs conversion of each protocol used in the host computer 100 or the disk controller 300 and transmits/receives data.

An internal network interface (I/F) 850 is an interface that is connected to each internal switch unit 330 and exchanges data with each unit of the disk controller 300.

A processor 820 is composed of a CPU and the like. It should be noted that in FIG. 14, only one processor 820 is shown, although plural processors may be provided in the channel control unit 800.

An LPAR instruction unit 830 instructs the processor 820 to perform LPAR allocation processing. In the LPAR instruction unit 830, the LPAR number of an LPAR that is currently under processing is indicated. Channel control unit LPAR information 831 stores information indicating a ratio of processing allocated to each LPAR, as described above. The LPAR instruction unit 830 obtains the ratio of each LPAR from the channel control unit LPAR information 831 and allocates an execution time to each LPAR.

A main memory 840 is a memory used by the channel control unit 800. The main memory 840 is composed of a program area 841 storing programs, a data area 842 storing data, and an LPAR table 844.

The LPAR table 844 is a table showing the LPARs and LUs allocated to and used by the LPARs.

The data area 842 includes plural areas 842-0 through 842-n used by the respective LPARs and a protocol conversion unit communication queue 843. In each LPAR area 842, data and a communication queue used by its corresponding LPAR are held.

The protocol conversion unit communication queue 843 is a communication queue used by the protocol conversion unit 810. On receiving a request from a host computer, the protocol conversion unit 810 temporarily holds the contents of the request in the protocol conversion unit communication queue 843.

Before starting processing of each LPAR, the processor 820 first refers to the protocol conversion unit communication queue 843. When any data is held in the protocol conversion unit communication queue 843, the processor transfers the data to the communication queue in a corresponding LPAR area.

On the other hand, as to each packet received by the internal network I/F unit 850, the internal network I/F unit 850 obtains an LPAR number by referring to the header of the packet and holds the packet in the communication queue in an LPAR area corresponding to the obtained LPAR number.

FIG. 15 shows an example of the LPAR table 844.

The LPAR table 844 is composed of a "port ID" column showing the identifiers of ports that received host commands, a "host group" column showing host groups to which hosts that have issued the host commands belong, an "LU" column showing the LU numbers of LUs with respect to which the host commands have been issued, and an "LPAR" column showing the LPAR numbers of the host commands.

On receiving a request (host command) from a host computer 100, the processor 820 of the channel control unit 800 finds a host group, to which the host belongs, with reference to the host ID of the host. The processor 820 obtains "a port ID", "a host group", and "an LU number" by referring to the contents of the host command. The processor 820 obtains a corresponding LPAR number by referring to the LPAR table 844 using each obtained piece of information as keys. Then, the processor 820 adds the obtained LPAR number to the header information of the packet and holds it in a corresponding LPAR area of the main memory 840.

As described in the first embodiment, after a disk capacity to be allocated to each LPAR is determined through the processing described with reference to FIG. 3, the LPAR table is set by the SVP 380 through the allocation of an LU corresponding to the disk capacity by the administrator.

It should be noted that in the LPAR table 312 of the channel control unit 320 according to the first embodiment, the processing shown in FIG. 15 may be performed. In this case, the protocol conversion unit 311 obtains an LPAR number by referring to the contents of a host command.

In the storage system according to the fourth embodiment configured in the manner described above, a ratio of the band width is allocated to each LPAR in the internal switch unit 330 of the disk controller 300. As a result, the arbitration between the usage ratios of a path band width in a post-consolidation system, in which plural systems have been consolidated, becomes easy.

It should be noted that as the internal switch unit according to the fourth embodiment, it is possible to use any one of the internal switch unit according to the first embodiment shown in FIG. 6, the internal switch unit according to the second embodiment shown in FIG. 9, and the internal switch unit according to the third embodiment shown in FIG. 11.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising:
    a plurality of disk drives; and
    a disk controller that is connected to the disk drives and reads/writes data from/into the disk drives,
    wherein the disk controller comprises:
    a disk control unit that exchanges data with the disk drives;
    a channel control unit that exchanges data with another computer;

a cache memory unit that temporarily holds data;
a switch unit that is connected to the disk control unit and the channel control units and exchanges data therewith; and
a control unit that controls the disk control unit, the channel control unit, and the switch unit,
wherein the disk controller is partitioned into a plurality of logical partitions,
wherein the control unit controls the partitioning into the logical partitions,
wherein said switch unit includes a storage unit adapted to store information indicating a ratio of a band width allocated for each of the logical partitions and an arbitration unit adapted to control a data transmission band width of each of the logical partitions by referring to the band width allocations for each of the logical partitions stored in the storage unit,
wherein said disk controller is partitioned into logical partitions and holds processor unit logical partition (LPAR) information indicating a ratio of processing of the processor units, switch unit LPAR information indicating a ratio of a band width allocated to each partitioned LPAR and cache memory unit LPAR information indicating a ratio of a cache memory capacity to be used by each partitioned LPAR, and
wherein said disk control unit controls partitioning of the channel control unit, the disk control unit, the switch unit, the processor unit and the cache memory unit based on the LPAR information.

2. The storage system according to claim 1,
wherein the switch unit comprises a reception unit that receives data and a transmission unit that transmits the data,
wherein the reception unit and the transmission unit are each partitioned into the logical partitions,
wherein the transmission unit includes the storage unit, the arbitration unit and a transmission buffer for each logical partition, and
wherein the transmission unit is adapted to control the data transmission band width of each logical partition by sending each transmission command for a logical partition to a corresponding transmission buffer based on the ratio of the data transmission band width determined for the logical partition in the band width information.

3. The storage system according to claim 1,
wherein the switch unit comprises a reception unit that receives data and a transmission unit that transmits the data,
wherein the reception unit and the transmission unit are each partitioned into the logical partitions,
the transmission unit includes the storage unit and the arbitration unit, and
the transmission unit is adapted to control the data transmission band width of each logical partition by reading the data for each logical partition from the storage unit based on the allocation determined for the logical partition and transmitting the read data.

4. The storage system according to claim 1,
wherein the switch unit comprises a reception unit that receives data, a transmission unit that transmits the data, and a data memory unit that holds the data,
wherein the reception unit is adapted to hold each piece of received data, a transmission destination of the data, and a number indicating a logical partition to which the data belongs, in the data memory unit,
the transmission unit comprises allocation information in which allocation of data transmission is determined for each logical partition, and
the transmission unit is adapted to control the data transmission band width of each logical partition by reading the data for each logical partition from the data memory unit based on the allocation determined by the arbitration unit and the storage unit for the logical partition in the allocation information and transmitting the read data.

5. The storage system according to claim 1, further comprising:
a terminal that receives input of information concerning a setting of the logical partitions of the disk controller,
wherein the terminal is adapted to:
determine, for each logical partition, an execution ratio of the control unit, a number of the disk drives, a capacity of a cache memory, and a ratio of a band width of the switch unit to be used by the logical partition, and
normalize a usage ratio of each resource of the control unit, the disk drives, the cache memory, and the switch unit to cause the logical partitions to use up approximately every resource.

6. A storage system comprising:
a plurality of disk drives; and
a disk controller that is connected to the disk drives and reads/writes data from/into the disk drives,
wherein the disk controller comprises:
a disk control unit that exchanges data with the disk drives;
a channel control unit that exchanges data with another computer; and
a cache memory unit that temporarily holds data; and
a switch unit that is connected to the disk control units and the channel control units and exchanges data therewith,
wherein the channel control unit is partitioned into a plurality of logical partitions,
wherein the channel control unit controls the partitioning into the logical partitions,
wherein said switch unit includes a storage unit adapted to store information indicating a ratio of a band width allocated for each of the logical partitions and an arbitration unit adapted to control a data transmission band width of each of the logical partitions by referring to the band width allocations for each of the logical partitions stored in the storage unit, and
wherein said disk controller is partitioned into logical partitions and holds processor unit logical partition (LPAR) information indicating a ratio of processing of the processor units, switch unit LPAR information indicating a ratio of a band width allocated to each partitioned LPAR and cache memory unit LPAR information indicating a ratio of a cache memory capacity to be used by each partitioned LPAR, and
wherein said channel control unit controls partitioning of the channel control unit, the disk control unit, the switch unit, the processor unit and the cache memory unit based on the LPAR information.

7. The storage system according to claim 6,
wherein the switch unit comprises a reception unit that receives data and a transmission unit that transmits the data,
wherein the reception unit and the transmission unit are each partitioned into the logical partitions,
wherein the transmission unit includes the storage unit, the arbitration unit and a transmission buffer for each logical partition, and wherein the transmission unit is adapted to control the data transmission band width of each logical partition by sending each transmission command for a logical partition to a corresponding transmission buffer based on the ratio of the data transmission band width determined for the logical partition in the band width information.

8. The storage system according to claim 6,
wherein the switch unit comprises a reception unit that receives data and a transmission unit that transmits the data,
wherein the reception unit and the transmission unit are each partitioned into the logical partitions,
the transmission unit includes the storage unit and the arbitration unit, and
the transmission unit is adapted to control the data transmission band width of each logical partition by reading the data for each logical partition from the storage unit based on the allocation determined for the logical partition and transmitting the read data.

9. The storage system according to claim 6,
wherein the switch unit comprises a reception unit that receives data, a transmission unit that transmits the data, and a data memory unit that holds the data,
wherein the reception unit is adapted to hold each piece of received data, a transmission destination of the data, and a number indicating a logical partition to which the data belongs, in the data memory unit,
the transmission unit comprises allocation information in which allocation of data transmission is determined for each logical partition, and
the transmission unit is adapted to control the data transmission band width of each logical partition by reading the data for each logical partition from the data memory unit based on the allocation determined by the arbitration unit and the storage unit for the logical partition in the allocation information and transmitting the read data.

10. A storage system comprising:
a plurality of disk drives; and
a disk controller that is connected to the disk drives and reads/writes data from/into the disk drives,
wherein the disk controller comprises:
a disk control unit that exchanges data with the disk drives;
a channel control unit that exchanges data with another computer;
a cache memory unit that temporarily holds data;
a shared memory unit that stores control information of the disk controller;
a switch unit that is connected to the disk control unit and the channel control unit and exchanges data therewith; and
a control unit that controls the disk control unit, the channel control unit, and the switch unit,
wherein the disk controller is partitioned into a plurality of logical partitions,
the control unit controls the partitioning into the logical partitions, and
the switch unit comprises a reception unit that receives data and a transmission unit that transmits the data,
wherein the reception unit and the transmission unit are each partitioned into the logical partitions,
wherein the transmission unit comprises a storage unit adapted to store information indicating a ratio of a band width allocated for each of the logical partitions, an arbitration unit adapted to control a data transmission band width of each of the logical partitions by referring to the band width allocations for each of the logical partitions stored in the storage unit, and a transmission buffer for each logical partition, and
wherein the transmission unit is adapted to control the data transmission band width of each logical partition by sending each transmission command for a logical partition to a corresponding transmission buffer based on the ratio of the data transmission band width determined for the logical partition in the band width information.

11. A logical partition setting method comprising:
setting logical partitions of a storage system,
wherein the storage system comprises:
a plurality of disk drives; and
a disk controller that is connected to the disk drives and reads/writes data from/into the disk drives,
wherein the disk controller comprises:
a disk control unit that exchanges data with the disk drives;
a channel control unit that exchanges data with another computer;
a cache memory unit that temporarily holds data;
a shared memory unit that stores control information of the disk controller;
a switch unit that is connected to the disk control unit and the channel control unit and exchanges data therewith;
a control unit that controls the disk control unit, the channel control unit, and the switch unit; and
a terminal that receives input of information concerning a setting of the logical partitions of the disk controller,
wherein said switch unit includes a storage unit adapted to store information indicating a ratio of a band width allocated for each of the logical partitions and an arbitration unit adapted to control a data transmission band width of each of the logical partitions by referring to the band width allocations for each of the logical partitions stored in the storage unit, and
wherein the terminal is adapted to perform the steps of:
determining, for each logical partition, an execution ratio of the control unit, a number of the disk drives, a capacity of the cache memory, and a ratio of a band width of the switch unit to be used by the logical partition,
normalizing a usage ratio of each resource of the control unit, the disk drives, the cache memory, and the switch unit to cause the logical partitions to use approximately every resource,
partitioning the disk controller into logical partitions and holding processor unit logical partition (LPAR) information indicating a ratio of processing of the processor units, switch unit LPAR information indicating a ratio of a band width allocated to each partitioned LPAR and cache memory unit LPAR information indicating a ratio of a cache memory capacity to be used by each partitioned LPAR, and
controlling to partition the channel control unit, the disk control unit, the switch unit, the processor unit and the cache memory unit based on the LPAR information.

12. The storage system according to claim 9, wherein the reception unit includes a logical partition judgment unit adapted to receive data packets, to determine a logical partition member from a header portion of each received data packet, and to send the data packets to a logical partition reception buffer corresponding to the logical partition number.

13. The storage system according to claim 6, wherein an execution ratio of the processor is calculated by dividing an IOs per second (IOPS) by a maximum IOPS of the processor.

14. The storage system according to claim 13, wherein the number of disk drives is calculated by dividing a result of the multiplication by a maximum IOPS per disk drive, wherein the result of the multiplication is calculated by multiplying the IOPS by a cache miss ratio, and wherein the cache miss ratio is calculated by subtraction of a cache hit ratio from one.

15. The storage system according to claim 14, wherein a band width of the switch unit is calculated by dividing a result of the multiplication by the total band width of an internal network, and wherein the result of the multiplication is calculated by multiplying the IOPS of the processor by the block size.

16. The logical partition setting method according to claim 11, further comprising the step of calculating an execution ratio of the processor by dividing an IOs per second (IOPS) by a maximum IOPS of the processor.

17. The logical partition setting method according to claim 16, further comprising the step of calculating the number of disk drives by dividing a result of the multiplication by a maximum IOPS per disk drive, wherein the result of the multiplication is calculated by multiplying the IOPS by a cache miss ratio, and the cache miss ratio is calculated by subtraction of a cache hit ratio from one.

18. The logical partition setting method according to claim 17, further comprising the step of calculating a band width of the switch unit by dividing a result of the multiplication by the total band width of an internal network, wherein the result of the multiplication is calculated by multiplying the IOPS of the processor by the block size.

* * * * *

UNITED STATES PATENT AND TRADEMARK OFFICE
CERTIFICATE OF CORRECTION

PATENT NO. : 7,350,050 B2
APPLICATION NO. : 10/986895
DATED : March 25, 2008
INVENTOR(S) : Shuji Nakamura and Akira Fujibayashi It is certified that error appears in the above-identified patent and that said Letters Patent is hereby corrected as shown below:

Col. 14 & 15 lines 9-29, Claim 1 insert

1. A storage system comprising:
        a plurality of disk drives; and
        a disk controller that is connected to the disk drives and reads/writes data from/into the disk drives,
        wherein the disk controller comprises:
        a disk control unit that exchanges data with the disk drives;
        a channel control unit that exchanges data with another computer;
        a cache memory unit that temporarily holds data;
        a switch unit that is connected to the disk control unit and the channel control units and exchanges data therewith; and
        a control unit that controls the disk control unit, the channel control unit, and the switch unit,
        wherein the disk controller is partitioned into a plurality of logical partitions,
        wherein the control unit controls the partitioning into the logical partitions,
        wherein said switch unit includes a storage unit adapted to store information indicating a ratio of a band width allocated for each of the logical partitions and an arbitration unit adapted to control a data transmission band width of each of the logical partitions by referring to the band width allocations for each of the logical partitions stored in the storage unit,
        wherein said disk controller is partitioned into logical partitions and holds processor unit LPAR information indicating a ratio of processing of the processor units, switch unit LPAR information indicating a ratio of a band width allocated to each partitioned LPAR and cache memory unit LPAR information indicating a ratio of a cache memory capacity to be used by each partitioned LPAR, and

UNITED STATES PATENT AND TRADEMARK OFFICE
CERTIFICATE OF CORRECTION

PATENT NO. : 7,350,050 B2
APPLICATION NO. : 10/986895
DATED : March 25, 2008
INVENTOR(S) : Shuji Nakamura and Akira Fujibayashi It is certified that error appears in the above-identified patent and that said Letters Patent is hereby corrected as shown below:

wherein said control unit controls partitioning of the channel control unit, the disk control unit, the switch unit, the processor unit and the cache memory unit based on the LPAR information.

Signed and Sealed this

Seventh Day of October, 2008

JON W. DUDAS
*Director of the United States Patent and Trademark Office*